Figure 1:
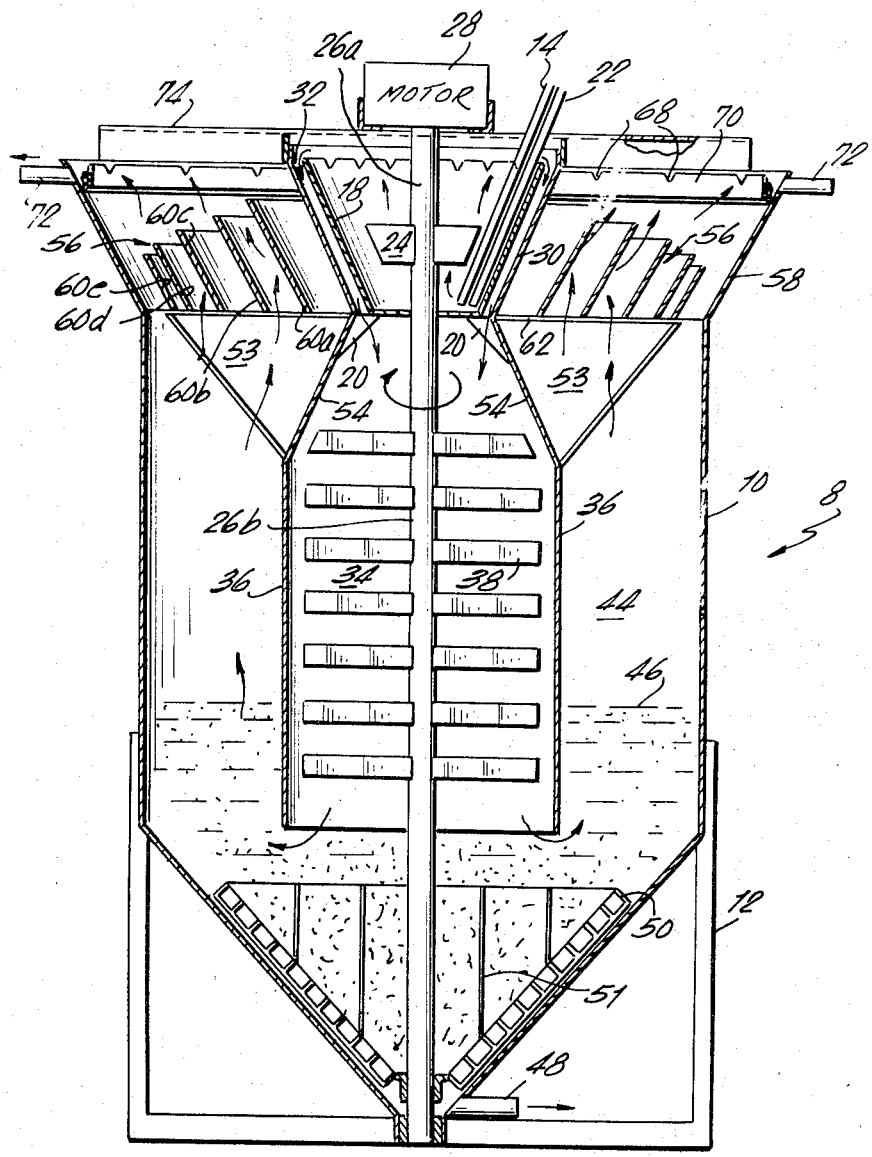

United States Patent
Zuckerman et al.

[15] 3,635,346
[45] Jan. 18, 1972

[54] SOLIDS SEPARATOR

[72] Inventors: Mathew M. Zuckerman, Yonkers; Alan H. Molof, New York, both of N.Y.

[73] Assignee: Envirotech Corporation, Palo Alto, Calif.

[22] Filed: Feb. 24, 1970

[21] Appl. No.: 13,641

[52] U.S. Cl. ............................................. 210/208, 210/521
[51] Int. Cl. ....................................................... B01d 21/16
[58] Field of Search .................... 210/84, 521, 522, 208, 311

[56] References Cited

UNITED STATES PATENTS

| 1,020,013 | 3/1912 | Arbuckle | 210/521 |
| 1,030,271 | 6/1912 | Arbuckle | 210/521 |
| 2,425,371 | 8/1947 | Green | 210/208 X |
| 3,482,694 | 12/1969 | Rice et al. | 210/84 X |
| 2,509,933 | 5/1950 | Lind | 210/522 X |

*Primary Examiner*—John Adee
*Attorney*—Richard F. Bojanowski and Robert R. Finch

[57] ABSTRACT

A solids removal device for use in the treatment of water and wastewater includes a final settling zone for removal of lightweight particles. The final settling zone comprises a liquid-carrying conduit defining a path for the upward flow of liquid and encloses settling plates dividing the conduit into flow spaces of upwardly increasing cross-sectional area and providing impingement and conglomeration surfaces for the accumulation and downward flow of solids.

7 Claims, 2 Drawing Figures

INVENTORS
ALAN H. MOLOF
BY MATHEW M. ZUCKERMAN
Amster & Rothstein
ATTORNEYS

SOLIDS SEPARATOR

This invention relates generally to apparatus for the separation of solid matter from liquids and more specifically to improved solids removal apparatus for use in processing water and/or wastewater.

The production of high-quality water from wastewater requires a high degree of removal of soluble and suspended material. In accordance with present treatment practices, conventional wastewater facilities remove suspended material continuously from wastewater by sedimentation, generally in tanks designed to provide sufficient time to permit suspended material to settle to the tank bottom. The settled solid material (commonly referred to as "sludge") can be continuously or intermittently withdrawn. This basic settling procedure is relatively inefficient in removing colloidal material and various techniques have been developed to improve this aspect of wastewater treatment.

In accordance with one such improvement used where high-quality water is required, the removal of colloidal solids is aided by the addition of coagulating chemicals which foster development of larger, denser particles from smaller particles and hence speed sedimentation. An exemplary coagulation technique involves the addition of lime or salts of aluminum or iron to wastewater followed by slow mixing of the wastewater-chemical solution so that clusters of particles (referred to as "flocs") develop and grow in size and weight for more efficient settling and removal.

One improvement in the removal of solid material from wastewater is the "solids contact" method wherein wastewater is continuously passed through a vertical settling tank containing previously settled materials. The direction of flow is from the lower end of the tank to the upper end and the upward flow velocity is smaller than the settling velocity of the solid material in the wastewater which is removed. While the liquid flows upward the previously settled material forms a layer of sludge (called a "sludge blanket") at the lower end of the tank. Once the process gets underway, the sludge blanket acts as a filter and nucleating agent through which the wastewater stream must pass. Solid material in the wastewater tends to adhere to the sludge blanket and is thus removed. Sludge is drawn off from the sludge blanket for reuse or disposal at a controlled rate so as to maintain the density and height of the sludge blanket for efficient solids removal.

Various devices for removing suspended and colloidal solids from wastewater according to this solids contact technique are currently available. Some of these devices which combine several process steps in a single piece of equipment are conventionally referred to as "solids contractors." While solids contactors are among the most effective sedimentation devices available, they do not remove very light particles which are not filtered by the sludge blanket and which do not have a sufficient settling velocity to reach the sludge blanket against the upward velocity of the liquid. Such particles are carried over in the output water reducing the output water quality.

In an attempt to improve the solids removal effectiveness, several such devices are now provided with regions of increasing cross-sectional area in the settling tank to decrease the upward velocity of the wastewater rising through the tank. The decrease in flow velocity is proportional to the increase in cross-sectional area in an obvious manner. Since the degree of removal of any settleable particle is proportional to the difference between the upward velocity of the liquid stream and the settling velocity of the particles, these devices tend to remove more of the lighter particles than conventional devices. However, removal of such light particles in these devices occurs only when the particles settle to the sludge blanket. To reach this layer, these particles must traverse a long settling path from the increased diameter region to the sludge blanket. These particles are often not removed due to localized turbulent upsets which occur during the long travel time and are thus frequently passed through the solids contactor.

It is a primary object of the present invention to remove settleable material from wastewater more effectively than has heretofore been possible and in a manner that will permit the removal of very small, lightweight particles. A related object of the present invention is to provide a solids contactor in which lightweight particles need only traverse a short settling path to places of removal and in which localized turbulences and flow upsets will be minimized so that solids carryover will be reduced.

In accomplishing these and other objects in accordance with the present invention, a solids contactor having a vertical settling chamber is provided with a final settling zone adjacent the upper end of the settling chamber including a plurality of inverted frustoconical settling plates of increasing diameter arranged one within another and defining annular conduits of upwardly increasing cross-sectional area therebetween. The settling plates provide impingement surfaces for the accumulation and eventual downward flow of these agglomerated lightweight particles which have not been previously removed.

Figure 2:
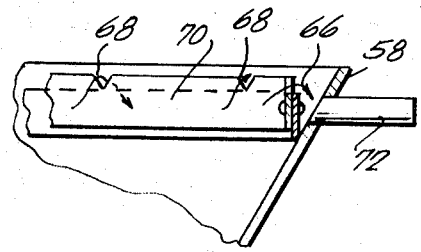

Further objects, features and advantages of the present invention will be more fully appreciated by reference to the following detailed description of a presently preferred, but nonetheless illustrative embodiment in accordance with the present invention, reference being made to the attached figures wherein:

FIG. 1 is a cross-sectional view of a solids contactor in accordance with the present invention; and FIG. 2 is a fractional view of the output section of the solids contactor.

Referring to the drawings, the solids contactor 8 of FIG. 1 is adapted to remove nonsoluble material including settleable colloidal and supercolloidal material from water or wastewater in accordance with an improved solids contact sequence. The contactor comprises a chassis 10 supported from beneath by a support brace 12 and enclosing a plurality of internal wall sections which divide the contactor into various wastewater treatment chambers and define a flow path therebetween. In each chamber, one aspect of the solids contact process is carried out. It is to be understood that the flow of wastewater through contactor 8 is continuous and that each chamber operates on the liquid as liquid passes through it.

Wastewater is introduced into contactor 8 through a wastewater input tube 14 which terminates at its lower end within an open or covered rapid mixing chamber 16 defined by a inverted frustoconical wall 18 supported by braces 20. Chamber 16 may also receive chemicals to aid coagulation through a chemical input tube 22 which extends parallel to tube 14 and releases chemicals at the lower end of chamber 16. Chamber 16 is provided with internal stirring paddles 24 mounted on a drive shaft 26a and driven by motor 28. Motor 28 may be any one of many conventional drive motors well known in the art and is shown in FIG. 1 in representational form only. Shaft 26a is geared to rotate at a relatively rapid rate, creating substantial liquid turbulence in chamber 16 and dispersing the chemical additives throughout the wastewater.

Liquid exits chamber 16 by flowing upwardly over the upper lip of wall 18 and downwardly through an annular channel 32 external to wall 18 and internal to support wall 30. Since it is important to maintain a uniform balance flow throughout the present process as will be described hereinafter, the upper lip of wall 18 should be maintained in a substantially horizontal position and preferably provided with V-notches so that water overflows chamber 16 uniformly about its circumference.

From rapid mixing chamber 16 the wastewater-chemical solution enters flocculation chamber 34 defined by cylindrical wall 36 positioned internal to and coaxial with chassis 10. Chamber 34 encloses a second plurality of paddle arms 38 mounted on drive shaft 26b to mix the liquid in chamber 34 relatively slowly as compared to chamber 16. Shafts 26a and 27b may comprise a single shaft so that paddles 24 and 38 rotate at equal speeds as shown in FIG. 1. In this embodiment, the dimensions of the paddles are selected so as to impart greater energy to the liquid in chamber 16 than in chamber 34 and to promote more rapid agitation in chamber 16. Also in this embodiment, paddle 24 has substantially more surface area than paddles 38. Alternatively, shafts 26a and 26b may be separate and driven by separate motors or by a single motor through a gear box which permits the shafts to rotate at different speeds in which case paddles 24 and 38 could be of the same relative size.

In flocculation chamber 34, the wastewater-chemical mixture is slowly agitated by paddles 38 permitting accumulations of solid material to develop and grow in size and density. The chemical-mechanical relationship of flocculation is well known in the wastewater-processing art. Such flocculation induces the creation of relatively large conglomerations of solid particles which will more easily be settled or filtered out of the wastewater.

Flocculation chamber 34 opens downwardly and the wastewater flow travels downwardly out of the flocculation chamber, turns through an angle of substantially 180° and travels upwardly into settling chamber 44 defined by cylindrical wall 36 and chassis 10. Chamber 44 is the primary settling and solids-contacting chamber wherein solid material settles downwardly while the liquid flow travels upwardly. The result of this process is the development of a sludge blanket 46 comprising a dense area of solid particles previously settled from the wastewater stream. Sludge blanket 46, as it accumulates, acts as a filter and nucleating agent in accordance with the well-known solids contact procedure whereby as wastewater exiting chamber 34 passes through sludge blanket 46 the solid particles carried therein tent to be filtered and adhere to the solid material in blanket 46 and are removed from the wastewater. Sludge blanket 46 thus tends to grow in size as the process proceeds. In accordance with conventional practice, the material in sludge blanket 46 is drawn off through a duct 48 at the lower end of contactor 8. The major portion of the sludge is disposed of by various means known to those skilled in the art. A minor portion of the sludge may be removed through duct 48 or other appropriately positioned ducts to be reintroduced into the wastewater in input tube 14 to accelerate the sedimentation process in accordance with techniques well known in the art.

The lower end of contactor 8 includes a rotary rake 50 which is secured to and rotates with shaft 26b to scrape the side of the conical lower section of contactor 8. Rake 50 includes upwardly projecting mixing arms 51 which move through the sludge and act to thicken it prior to removal.

In a preferred method of operation, the upper end of sludge blanket 46 is maintained within the vertical settling chamber 44 or the first expansion area by intermittent or continuous withdrawal of sludge through takeoff duct 48 or optional drawoff ducts.

As the wastewater rises through chamber 44 it enters a first expansion area 53 formed by exterior wall 10 and interior wall 54 which angles inwardly. Since the cross-sectional area of the annular flow space in section 53 is larger than the cross-sectional area of the annular flow space in section 44, the upward velocity of the liquid decreases as its flows upwardly through chamber 53. As the upward velocity decreases, lighter particles tend to settle out more readily since their settling rate is proportional to the difference between the upward velocity of the liquid and the settling velocity of the particles. Expansion chamber 53 thus aids settling of smaller lighter particles in the wastewater. Additionally, chamber 53 establishes a uniform radial velocity distribution before the liquid passes into the final settling zone.

Above chamber 53 is the final settling zone generally designated 56 which acts to remove small lightweight particles. The final settling zone is bounded by the external wall 58 and internal wall 30 and includes a plurality of inverted frustoconical settling plates 60a through 60e supported by struts 62. Settling plates 60a–60e define flow paths of annular cross section between adjacent plates for the upward flow of liquid from chamber 53 to output weir 70 to be described hereinafter.

The annular flow spaces between adjacent pairs of settling plates are dimensioned such that the upflowing liquid is evenly distributed over the entire flow area. Such distribution prevents local turbulences which would interfere with the settling process. To accomplish such even distribution, the cross-sectional area of the inlet to the annular flow spaces between plates 60a–60e are all equal. Since these annular channels have different average diameters, the width of each flow space (the distance between adjacent plates) must be different for the inner plates than for the outer plates. A particular distance relationship is shown in FIG. 1. Further, the upper edge of each frustoconical plate is located at an elevation below the surface of the contactor such that the cross-sectional area between the contactor top surface and the upper edge of the plate is equal to the total cross-sectional area of the inlets interior to the plate. The use of uniform inlet and outlet areas permits a constant and steady flow state throughout the final settling area preventing local upsets and disturbances which would inhibit settling.

It will be appreciated that the cross-sectional area of each annular flow space is greater at the upper end of the flow space than at the lower end and increases at a continuous rate from the lower end to the upper end. This increase occurs because the average diameter of the annular flow spaces at the lower end of the settling plates is smaller than the average diameter of the annular flow spaces at the upper end and the plates 60a–60e are parallel to one another. The velocity of the upflowing liquid thus decreases as the liquid flows upwardly through the final settling section. This progressive reduction in velocity further aids the settling of a lighter weight particle which has low settling velocities.

An additional advantage arises from the plate spacing which can be so arranged that any particle traveling in a vertical direction would impinge on the under surface of a settling plate.

Settling plates 60a–60e provide a collection surface for lightweight solid particles in the liquid stream which travel downwardly as the liquid flows upwardly until they impinge on the interior surface of a settling plate 60a–60e. The solid material which accumulates on the interior surface of the settling plates forms a flow layer of solid material which travels downwardly by its own weight along the surface of the settling plates to the plate bottom and from the plate bottom in large clusters to the sludge blanket. Similarly, impingement and accumulation on the bottom surface of the settling plate 60a–60 could occur directly for the lightweight particles which travel upwardly as the liquid flows upwardly. This mass of concentrated suspended material generally comprises the lightweight particles which would not have been removed has they been required to settle to the sludge blanket individually. The dense globules of material which break away from the plates 60a–60e settle rapidly to the sludge blanket where they are removed in the manner described above.

Clarified liquid which flows outwardly from the upper end of settling plates 60a–60e spills over the upper lip of circular weir 70 and into annular channel 66 defined by weir 70 and the upper edge of sidewall 58. To insure a uniform flow about the circumference of weir 70, the weir includes a series of V-notches 68 about its circumference. The upflowing liquid flows out of V-notches 68 at a relatively uniform rate about the circumference of the weir and into channel 66 where it is drawn off by output tubes 72 located at equidistant points about the circumference of the contactor. Additionally, weir 70 is maintained in a substantially horizontal position to insure uniform flow.

When lime is the chemical addition the entire unit may be covered by a top plate 74 to reduce the entrance of atmospheric carbon dioxide which would form calcium carbonate floc at the surface of the contactor and be carried over into the effluent as suspended solids.

The final settling zone thus permits removal of light particles which are not removed by conventional devices. Throughout the final settling zone, the dynamic flow of liquid is maintained such that local turbulences and upsets are avoided and so that the system flow is relatively uniform throughout the 360° circumference of the final settling zone.

It is to be understood that the above described arrangements are merely examples of the principles of the present invention. Numerous other embodiments will be obvious to those skilled in the art without departing from the spirit or scope of the invention.

What is claimed is:

1. Apparatus for removing nonsoluble material from a liquid comprising a conduit defining a flow path of upwardly increasing cross-sectional area for the upward flow of said liquid, said conduit enclosing a plurality of inverted frustoconical spaced-apart settling plates which extend outwardly from the center in a stepdown fashion and providing a relatively constant increasing vertical distance from the upper edge of each settling plate, said spaced-apart plates defining flow paths therebetween of upwardly increasing cross-sectional area and for providing impingement surfaces for the accumulation and downward flow of said nonsoluble material and wherein the cross section area of said flow paths are substantially equal at their inlet ends, input means adjacent the lower end of said conduit for directing liquid to said conduit, and output means adjacent the upper end of said conduit for directing clarified liquid away from said conduit.

2. Apparatus in accordance with claim 1 wherein the settling plates are substantially parallel to each other and thereby provide a substantially uniform increase in the cross-sectional areas of said subflow paths from the lower end of said conduit to the upper end thereof.

3. Apparatus in accordance with claim 2 wherein the spaced-apart, substantially parallel settling plates are inverted frustoconical plates of increasing diameter arranged one within another.

4. Apparatus for removing settleable material from a liquid comprising a chassis having a primary liquid inlet and a liquid outlet and defining a flow path for liquid therebetween, said flow path including a cylindrical flocculation chamber communicating at its upper end with said inlet, an annular settling chamber external to said flocculation chamber and communicating at its lower end with the lower end of said flocculation chamber whereby said flow path emanates in a downwardly direction from said flocculation chamber, turns outwardly and upwardly through an angle of substantially 180° into said annular settling chamber, and a final settling zone including a plurality of inverted frustoconical settling plates arranged one within another in outward radially stepdown arrangement and in parallel relationship to each other to define therebetween substantially concentric liquid flow paths having substantially equal cross-sectional areas at their inlet ends and upwardly increasing cross-sectional area, said stepdown arrangement providing a relatively constant increasing vertical distance from the upper edge of each settling plate and said settling plates at their lower ends communicating with the upper end of said annular settling chamber and at their upper ends with said outlet.

5. Apparatus in accordance with claim 4 wherein said annular settling chamber includes a section of upwardly increasing cross-sectional area immediately preceding said final settling area.

6. Apparatus in accordance with claim 4 further including means located below said settling chamber and said flocculation chamber for receiving accumulations of said settleable material and for removing said accumulations at a controlled rate.

7. Apparatus in accordance with claim 4 wherein said flow path further includes a rapid mixing chamber communicating at its input end with said primary liquid inlet and at its output end with said flocculation chamber, said rapid mixing chamber including a secondary liquid inlet for the addition of chemicals to said liquid.

* * * * *